April 7, 1970          A. S. IRWIN          3,504,902
PIN STABILIZED LAMINATED BEARING FLEXIBLE JOINT
Filed Aug. 22, 1967
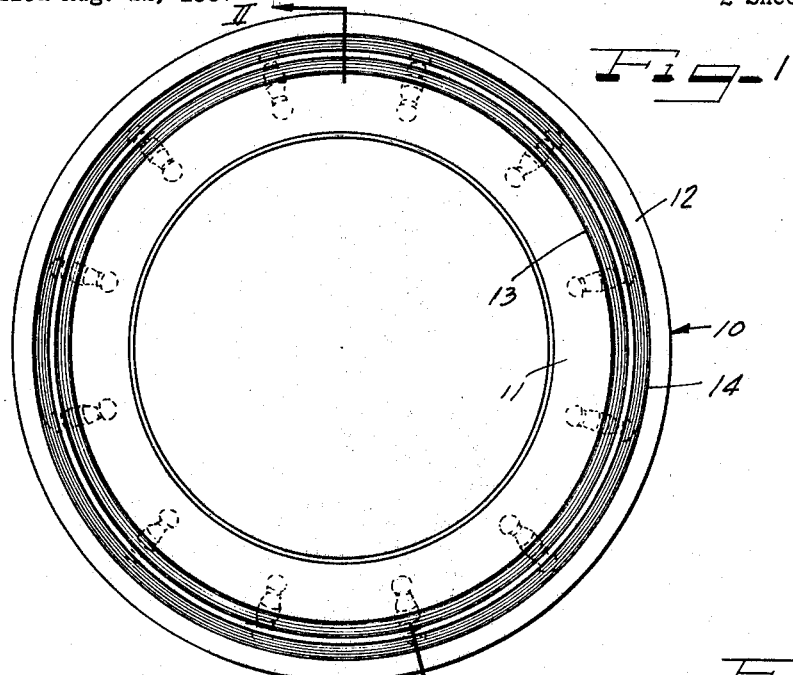
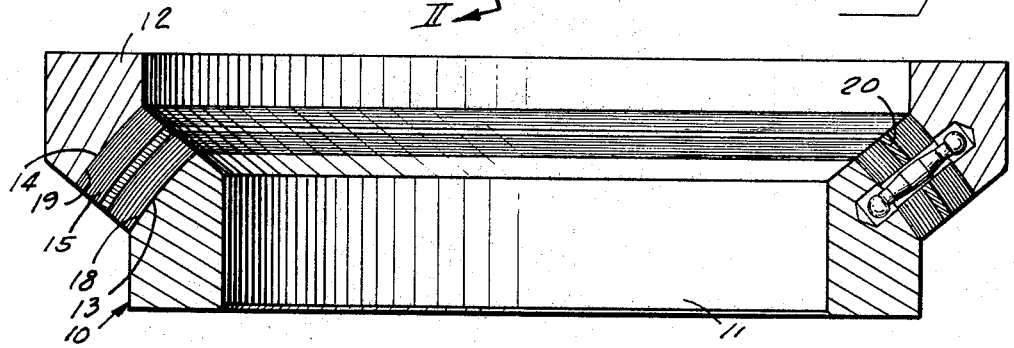
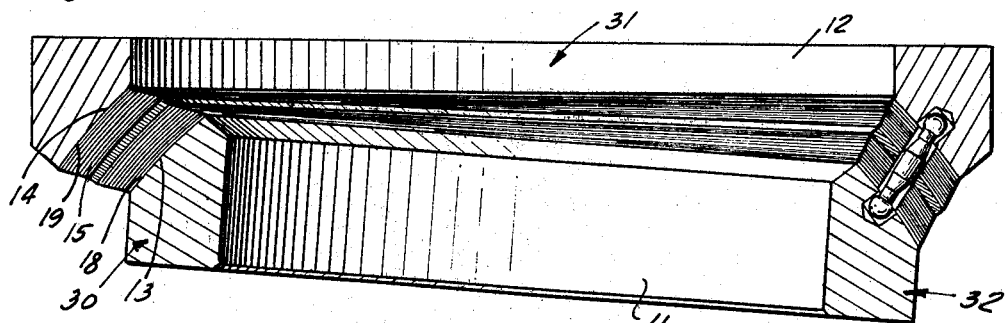
INVENTOR.
ARTHUR S. IRWIN
BY *Hill, Sherman, Meroni, Gross & Simpson* ATTORNEYS

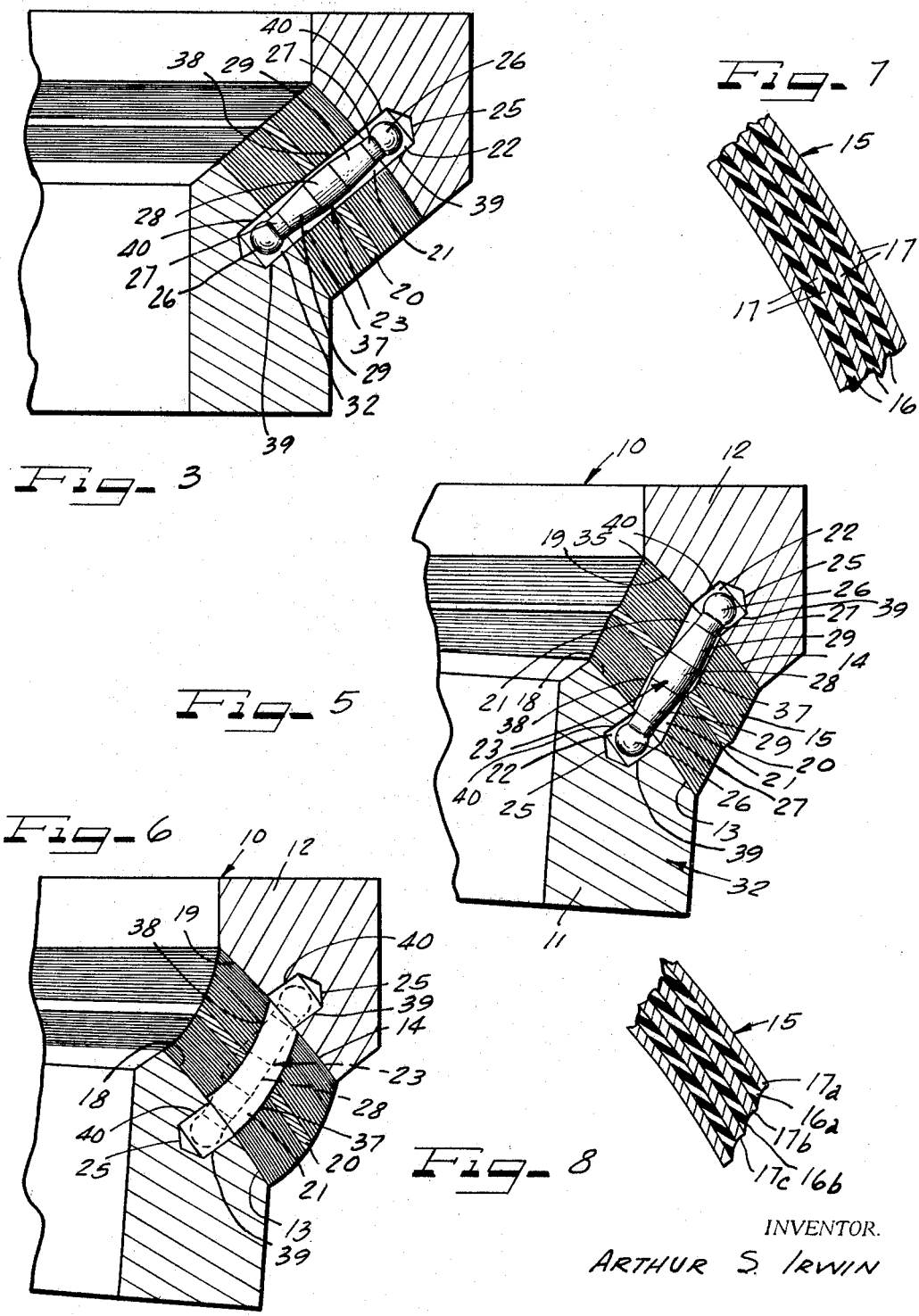

United States Patent Office 3,504,902
Patented Apr. 7, 1970

3,504,902
PIN STABILIZED LAMINATED BEARING
FLEXIBLE JOINT
Arthur S. Irwin, Jamestown, N.Y., assignor to TRW, Inc., Cleveland, Ohio, a corporation of Ohio
Filed Aug. 22, 1967, Ser. No. 662,323
Int. Cl. F16f 1/14; B21h 1/12, 1/14
U.S. Cl. 267—1                             4 Claims

ABSTRACT OF THE DISCLOSURE

A pin stabilized laminated bearing consisting of alternate layers of bonded together bearing material and elastomer for use between two members having opposed bearing faces. The laminated bearing is stabilized against buckling by the provision of a relatively thick stabilizing ring bonded in the bearing stack intermediate the ends of the stack and by pins extending freely through holes in the stack and stabilizing ring and received freely in recesses in the opposed bearing faces.

BACKGROUND OF THE INVENTION

Field of the invention

This invention relates to laminated bearings and more particularly to laminated bearings stabilized against buckling.

Prior Art

Laminated bearings are known to the art. See for example the patent to Hinks 2,900,182. Such laminated bearings consist of stacks of bonded together alternate layers of metal and elastomer. Due to the thinness of the elastomer layers, these bearings are substantially incompressible, yet because of the shear elasticity of the elastomer layers, they are able to accommodate relative movement between the ends of the bearing stack. The relative movement which can be accommodated by a bearing stack consisting of a given width to thickness elastomer ratio is dependent upon the height of the bearing stack. Therefore, in those instances where a greater degree of relative movement is desired, the height of the stack can become appreciable. As the height of the bearing stack increases, the tendency of the stack to bow out in its center section or buckle under pressure or load increases.

Where the relative movement between the ends of the bearing stack which the bearing is expected to encounter during use consists of rotational or torsional movement, elastometric or metallic sleeves or collars surrounding the bearing stack have been suggested as methods of stabilizing the stack against buckling. However, where the relative movement between the ends of the stack which the bearing is expected to encounter in operation is linear such as in a tilting or swivel bearing and joint rather than torsional, such collars or sleeves or other fixed rigid restrictions will interfere with the bearing's ability to accommodate the required motion.

SUMMARY OF THE INVENTION

The present invention overcomes this deficiency in the pior art and provides for laminated bearing capable of accommodating lateral displacement between the ends of the bearing stack which is stabilized against buckling. The bearing stack is provided with a relatively thick stabilizing ring or rings bonded intermediate the ends of the bearing stack. Holes are provided through the bearing stack and stabilizing ring. The holes communicate with recesses in opposed bearing faces which mate with and are bonded to the ends of the bearing stack. Pins are provided through the holes in the stack and stabilizing ring and are received in the recesses in the bearing faces. The diameter of the pins is less than the diameter of the holes and recesses and the length of the pins is shorter than the distance between the bottoms of the recesses in the opposed bearing faces. The pins are therefore freely received in the holes and recesses.

Because the pins are freely received in the cooperation holes and recesses, they do not interfere with relative linear movement between the opposed bearing faces. During lateral movement of the opposed bearing faces the holes in the bearing stack will continue to have a straight axis and the pins will not bind up the bearing. However, when the bearing stack begins to buckle, the axis of the holes will begin to curve. At that point because the pins will not curve, they will effectively stabilize it against further buckling.

It is then an object of this invention to provide a laminated bearing consisting of alternate layers of bonded together bearing material and elastomer which is stabilized against buckling by the provision of pins extending through holes in the bearing stack.

It is a further object of this invention to provide a laminated bearing consisting of alternate bonded together layers of bearing material and elastomer for use between two relatively movable opposed bearing surfaces which is stabilized against buckling by the provision of a relatively thick stabilizing ring bonded intermediate the ends of the stack and buckle resisting rigid pins extending freely through holes in the bearing and stabilizing ring and received in recesses in the bearing surfaces.

It is a further and more specific object of this invention to provide a pin stabilized laminated bearing swivel joint consisting of a stack of rings of bonded together bearing material and elastomer which is bonded to opposed bearing rings and accommodates tilting movement between the bearing rings wherein the stack is stabilized against buckling by the provision of a relatively thick stabilizing ring bonded in the stack intermediate its ends and rigid pins extending freely through holes in the stabilizing ring and stack and received in recesses in the bearing rings to accommodate relative tilting movement of the opposed bearing rings while acting to prevent buckling of the bearing stack.

BRIEF DESCRIPTION OF THE DRAWINGS

FIGURE 1 is a plan view of a swivel joint embodying the principles of this invention and showing a typical pin placement arrangement;

FIGURE 2 is a cross-sectional view of the swivel joint of FIGURE 1 taken along the line II—II of FIGURE 1;

FIGURE 3 is a fragmentary enlarged view of a portion of FIGURE 2 illustrating the pin placement;

FIGURE 4 is a cross-sectional view similar to FIGURE 2 showing the swivel joint in a flexed or tilted position;

FIGURE 5 is a fragmentary enlarged view of a portion of FIGURE 4 illustrating displacement of the pin in the tilted or flexed position of the joint;

FIGURE 6 is a view similar to FIGURE 5 but illustrates how the pin prevents buckling of the stack while accommodating tilting or flexing;

FIGURE 7 is an enlarged fragmentary cross-sectional view of a laminated bearing;

FIGURE 8 is an enlarged fragmentary cross-sectional view of a laminated bearing accommodating lateral displacement of the laminae.

DESCRIPTION OF THE PREFERRED EMBODIMENTS

Although the invention will be hereinafter described as embodied in a swivel joint for connecting the nozzle or exiting cone to a body of a rocket engine, it is to be understood that the principles of this invention are applicable to any embodiment in which there is lateral movement between the opposed bearing surfaces.

FIGURES 1 and 2 illustrate a rocket engine and nozzle connection joint 10 consisting generally of a nozzle cone connection ring 11 and an engine connection ring 12. The ring 11 has a bearing face 13 and the ring 12 has a bearing face 14. The bearing faces 11 and 12 are cut from concentric spheres. The face 13 is convex and cut from a sphere of small diameter while the face 14 is concave and cut from the sphere of larger diameter.

Interposed between the two bearing faces 13 and 14 is a fragmental spherical laminated bearing ring 15. The bearing ring 15 is a section of a hollow sphere. Proper dimensional understanding of the relationship between the ring 11, the bearing 15 and the ring 12 can be had if it is assumed that the bearing face 13 is a surface of revolution struck from an arc having a given radius, and that the bearing face 14 is the same, but struck from a radius greater than the radius of the face 13 and having a common center. In that case the bearing 15 is a section of a hollow sphere with the same center as the radii from which faces 13 and 14 are struck and having stack brought equal to the difference in length between the radii of faces 13 and 14.

In operation the bearing faces 13 and 14 move relative to each other. This movement may be either torsional, that is, a rotation of one face with respect to the other, or linear, or any combination of these movements. Linear movement may be considered as being any movement between the two faces which is not the result of rotational or torsional movement or the result of moving the two faces directly away from or towards each other. The normal linear movement which is encountered in operation of the joint 10 is caused by rocking the ring 11 with respect to the ring 12. In the embodiment shown a rocket nozzle cone is attached to the ring 11 while the rocket engine is attached to the ring 12. In order to change the direction of the rocket's travel, the nozzle cone is tilted with respect to the engine thereby changing the thrust direction of the rocket gasses. Normally, the change is a matter of a relatively few degrees from the perpendicular. The bearing 15 is designed to permit relative linear movement between the bearing faces 13 and 14.

As shown in FIGURE 7, bearing 15 consists of a stack of alternate layers of elastomer 16 and bearing material 17. The bearing material may be of metal, plastic or the like. The layers are bonded together and due to the shear elasticity of the elastomer layers 16 of the bearing 15 is able to accommodate relative movement between the ends of the bearing stack. Referring to FIGURE 2, the bearing 15 has an end 18 which is bonded to the bearing face 13 and an end 19 which is bonded to the bearing face 14. Because of the shear elasticity of the elastomer layers of the bearing 15, it is able to accommodate the torsional or linear movement of the bearing faces 13 and 14.

However, when laminated bearings are built up into stacks of appreciable height, there is a tendency for them to buckle or bow out in their center sections when subject to compression loads or side pressure. This tendency to buckle is increased when the relative movement between the bearing faces which the bearing is accommodating is linear rather than torsional. In order to stabilize the bearing 15 against buckling, a relatively thick stabilizing ring 20 is bonded in the bearing stack 15 intermediate the ends 18 and 19 thereof. The stabilizing ring 20 has the same curvature as the bearing 15 and is made of a nonelastomeric substance such as metal, plastic or the like. More than one such ring can be provided.

As is shown in FIGURES 1 and 3, a plurality of spaced apart holes 21 are provided through the bearing stack 15 and stabilizing ring 20. The holes 21 communicate at either end with recesses 22 which are formed into the rings 11 and 12 at the bearing faces 13 and 14. The recesses 22 have a diameter equal to or slightly less than the diameter of the holes 21. The recesses 22 are concentric with the holes 21 which the bearing 15 is in its neutral or nonflexed position.

Pins 23 are received in the holes and recesses. The pins 23 have a length which is less than the distance from the back wall 24 of the recesses in the face 13 to the back wall 25 of the recesses in the face 14 but greater than the distance between the faces 13 and 14. The pins 23 may have spherical ends 26 which are integral with cylindrical collars 27 which may have a diameter less than the diameter of the spherical ends 26. The center portion of the pins 23 consists of a cylindrical portion 28. The cylindrical portion 28 is integral with the collars 27 through tapered cylindrical sections 29. The cylindrical center section 28 has a diameter greater than the diameter of the collar 27 but less than the diameter of the holes 21. The spherical ends 26 have a diameter less than the diameter of the recesses 22. The pins 23 are rigid and may be made of metal, plastic or the like, and may be of cylindrical, or other shape, as long as proper clearances are provided with adjacent parts. FIGURE 1 illustrates a typical manner of spacing the holes 21, recesses 22, and pins 23.

FIGURE 4 illustrates the swivel joint 10 in its tilted or flexed position. This position is the result of swivelling or tilting the ring 11 relative to the ring 12. This causes the ring 11 to move laterally with respect to the ring 12 with the portion of the ring 11 indicated by the reference numeral 30 moving up and into the central bore section 31 of the ring 12 while an opposite portion of the ring 11 identified by the reference numeral 32 moves down and out from the central bore 31 of the ring 12. The opposed bearing faces 13 and 14 therefore move laterally with respect to each other. This lateral movement is accommodated in the bearing 15 by the shear elasticity of the elastomer layers 16 which allow each bearing material layer 17 to move linearly a slight distance relative to the next successive bearing material layer 17. The linear movement between each successive bearing material layer 17 is small, but the accumulation of such movement by all of the layers of the bearing stack 15 allows the end 18 of the bearing stack to move with the bearing face 13 while the end 19 remains with the bearing face 14.

FIGURE 5 illustrates the effect of such lateral movement on the holes 21, recesses 22, and pins 23. The bearing material layer 35 of the bearing 15 at the end 19 which is bonded to the face 14 of ring 12 remains in substantially the same position relative to ring 12 that it had when the joint 10 was in its neutral or unflexed position. However, each succeeding layer has shifted to accommodate the lateral movement of ring 11 except for bearing material layer 36 at the end 18 of the bearing stack 15 which is bonded to the bearing face 13 of layer 11 which has retained substantially the same position it had relative to layer 11 when the joint 10 was in its neutral or unflexed position. FIGURE 8 illustrates the step like effect on the edges of the bearing stack 15 caused by the relative linear movement of the laminae. The bearing material layers 17a, 17b and 17c in the normal or unflexed position have perpendicularly aligned peripheries as do the elastomer layers 16a and 16b. However, in the flexed position, the periphery of layer 17b extends beyond the periphery of layers 17a and the periphery of layer 17c extends beyond the periphery of layer 17b. These linear peripheral extensions of the bearing material layers are accommodated by the shear elasticity of the elastomer of the elastomeric layers 16a and 16b, the peripheries of which become tapered.

For purposes of illustration it may be assumed that as shown in cross section the hole 21 has opposed side walls 37 and 38 and the recesses 22 have opposed side walls 39 and 40. In the neutral or unflexed position of the joint 10 the side walls 37, 38, 39 and 40 are all parallel to each other and the recesses 22 and hole 21 have a common axis. However, in the flexed position of the joint 10 the recesses 22 in the ring 11 move relative to the recesses 22 in the ring 12. After such a movement the recesses 22 and holes 21 no longer share a common axis nor are the side walls 37 and 38 of the hole parallel with the side walls 39 and 40 of the recesses. The side walls 37 and 38 of the hole remain, except for the step-like lateral progression of the individual layers of the bearing stack 15, substantially parallel to each other. Because the pin 23 has a diameter less than the diameter of the holes 21 and the recesses 22 and a length less than the distance between the back walls, 24, 25 of normally opposed recesses 22, they are freely received in the holes and recesses. Because they are freely received, they do not obstruct the lateral movement of the ring 11 in relation to the ring 12. Further, because the side walls 37 and 38 of the hole remain parallel, the pins 23 do not obstruct normal linear displacement of the layers of the bearing 15.

However, if the bearing 15 begins to buckle, as is illustrated in FIGURE 6, the walls 37 and 38 of the holes 21 no longer remain parallel. FIGURE 6 illustrates the buckling of the bearing stack 15 at the location of one of the holes 21 which could occur without the presence of a pin 23. The normal position of the pin 23 is shown by broken lines.

Buckling of the bearing stack 15 can be caused either by excess pressure tending to force the bearing faces 13 and 14 towards each other or by side pressure against either the inside 45 or outisde 46 surfaces of the bearing stack. The bearing stack 15 buckles by the central section thereof bowing out with respect to the ends of the stack. Although the bearing stack 15 is designed to accommodate lateral movement between the bearing faces 13 and 14, the inside and outside surfaces 45 and 46 of the bearing stack remain substantially parallel. During buckling however as the bearing bows out, the inside and outside surfaces 45 and 46 of the bearing stack 15 become curved. The pins 23 prevent the bearing from buckling in this matter inasmuch as when the stabilizing ring 20 moves laterally with respect to the ends 18 and 19 of the bearing stack 15 in a buckling motion the side walls 37 and 38 of the holes 21 will tend to become non-parallel. The presence of a rigid pin 23 in the hole 21 will form a beam preventing the walls 37 and 38 from curving. It can be seen from FIGURE 6 that before the walls 37 and 38 can curve to an appreciable extent the stabilizing ring 20 will contact the cylindrical central portion 28 of the pin 23. This will prevent further buckling. The provision of the stabilizing rings 20, because of their relative thickness and rigidity, will prevent buckling of the bearing stack 15 between pin locations.

In order to fix the position of the pins 23 in relation to the holes 21 and recesses 22, the holes and recesses may be fitted with elastomer after insertion of the pins.

From the above description it will, therefore, be understood that my invention provides for a laminated bearing for use between opposed surfaces which will accommodate relative linear and torsional movement between the surfaces but which is stabilized against buckling.

Although minor modifications might be suggested by those versed in the art, it should be understood that I wish to embody within the patent warranted herein, all such modifications as reasonably and properly come within my contribution to the art.

I claim:
1. A bearing for use between two surfaces having relative lateral movement which comprises: alternating layers of bearing material and elastomer bonded together, said layers built up into a bearing stack, at least one thick non-elastomeric layer bonded intermediate the ends of stack, one of the ends of said stack engaging and bonded to one of the bearing surfaces and the other of the ends of said stack engaging and bonded to the other of said bearing surfaces, a hole through said stack and said relatively thick layer recesses in said bearing surfaces communicating with said hole, and a rigid pin freely received in said hole and said recesses, said pin contacting portions of the said thick layer when the said stack begins to buckle whereby the said pin is effective to prevent buckling of the bearing stack while allowing relative lateral movement between the ends of said stack.

2. A swivel joint comprising a pair of mounting rings having spaced opposed bearing faces, a laminated bearing ring stack between said faces and bonded thereto, said stack comprising alternate thin laminae of elastomer and non-elastomer bonded together and shiftable under shear stress to accommodate tilting of the mounting rings, a stabilizing ring bonded in the stack intermediate the ends thereof, circumferentially spaced registering holes and recesses in the mounting ring and stack, and rigid pins extending freely through the holes into the recesses, said pins retained at the ends thereof within the said recesses without transmitting torque between the said faces, the said pins contacting the said stabilizing ring when the said stack begins to buckle to restrain lateral movement of the intermediate portion of the said stack with respect to the ends of the said stack whereby the axis of the said hole remains substantially straight, the said pins effective to limit buckling of the stack while accommodating said shifting of the laminae for relative tilting of the mounting.

3. A laminated bearing stack accommodating lateral displacement and side loads without excessive buckling which comprises: a stack of alternate bonded together thin elastomer and nonelastomer layers, a central rigid laminate bonded in the stacks between the ends of the stack, rigid bearing means bonded to the ends of the stack, registering holes and recesses through the stack, rigid laminate and rigid bearing means, and rigid pins extending freely through the holes into the recesses forming beams stopping buckling of the stack while being freely swingable to accommodate lateral displacement of the laminae, the said pins dimensioned to allow lateral shifting of the ends of the said stack relative to one another whereby the central axis of the holes remains substantially a straight line, the said pins effective to contact the said rigid laminae when the said stack begins to buckle whereby the said central axis begins to curve, the said contact of the said central rigid laminae with the said pins effective to prevent further movement of the said central rigid laminae with respect to the ends of the said stack in a lateral direction whereby the said stack is prevented from buckling, the said holes, recesses and pins spaced from one another, and the said central rigid laminae effective to prevent buckling of the said stack in the spaces between the said holes, recesses and pins.

4. In a laminated bearing assembly accommodating relative linear movement between two ring bearing surfaces engaging opposite ends of a hollow spherical section laminated bearing stack, the improvement of at least one relatively thick non-elastomer layer bonded intermediate the ends of the said stack, a plurality of circumferentially spaced apart bores through said stack and relatively thick layer, a plurality of cooperating recesses in said bearing surfaces communicating with each of said bores, rigid pins in each of said bores, the ends of said pins normally projecting freely into said recesses, the bores, recesses and pins dimensioned to allow said linear movement while stabilizing the stack against buckling, the said stack accommodating lateral movement of the said bearing surfaces by interparticle flow of elastomer layers of the laminated bearing allowing relative linear movement between the ends of the said stack, the central axis of the said bores remaining substantially straight, the said pins normally lying along said central axis, the said thick non-elastomer layer adapted to contact the said pins when the said stack buckles whereby the said axis becomes curved, the said pins effective to prevent further curvature of the said axis, the said pins effective to retain the said thick layer in position with respect to the said ends of the said stack, and the said thick layer effective to prevent buckling of the stack intermediate the said pins.

(References on following page)

References Cited

UNITED STATES PATENTS

| | | | |
|---|---|---|---|
| 2,900,182 | 8/1959 | Hinks | 308—2 |
| 2,902,844 | 7/1959 | Rzeppa | 64—21 |
| 2,908,151 | 10/1959 | Wahlmark | 64—21 |
| 3,071,422 | 1/1963 | Hinks | 308—237 |
| 3,083,065 | 3/1963 | Hinks et al. | 267—57.1 |
| 3,342,041 | 9/1967 | Nebiker | 64—11 |
| 3,390,899 | 7/1968 | Herbert et al. | 239—265.35 X |

ARTHUR L. LA POINT, Primary Examiner

H. BELTRAN, Assistant Examiner

U.S. Cl. X.R.

29—148.4; 60—271; 64—11, 21; 170—160.51; 239—265.17, 265.35; 267—57.1; 285—51, 223, 238, 263, 404; 287—85, 87; 308—2, 26, 237